June 3, 1924.
F. LAIST ET AL
1,496,004
PROCESS OF PREPARING PURE ZINC SULPHATE SOLUTIONS
Filed Jan. 5, 1920
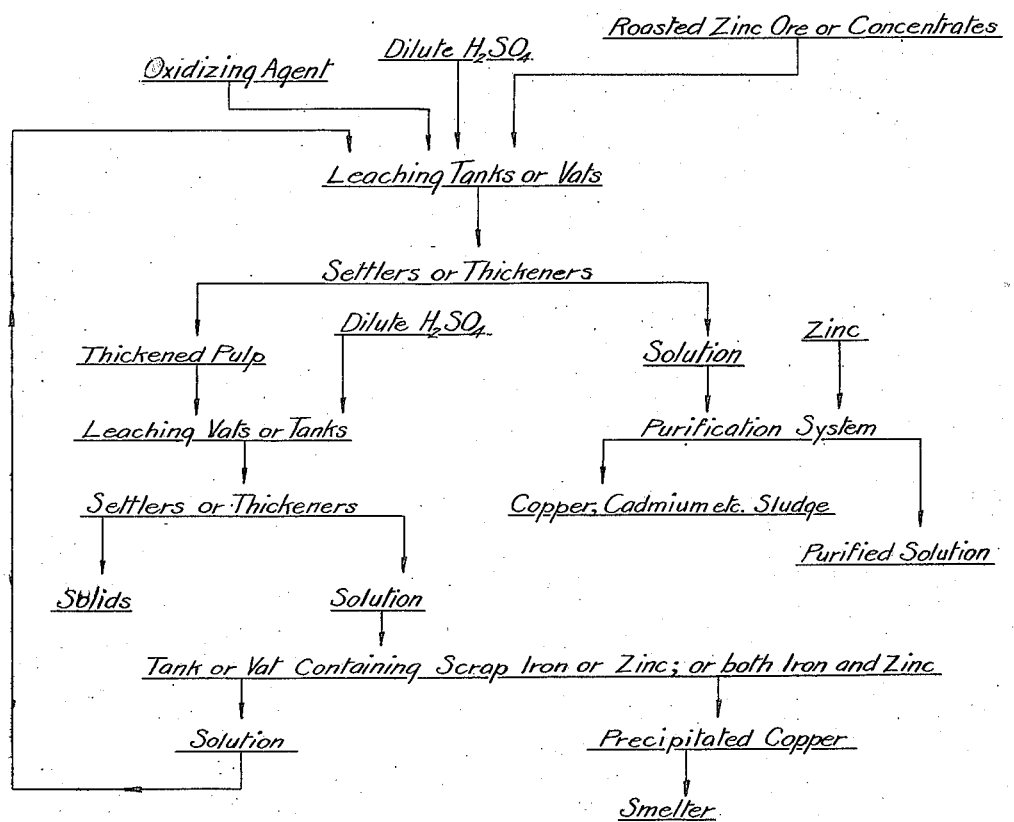

Patented June 3, 1924.

1,496,004

UNITED STATES PATENT OFFICE.

FREDERICK LAIST, OF ANACONDA, AND JAMES ORR ELTON, OF GREAT FALLS, MONTANA, ASSIGNORS TO ANACONDA COPPER MINING COMPANY, OF ANACONDA, MONTANA, A CORPORATION OF MONTANA.

PROCESS OF PREPARING PURE ZINC-SULPHATE SOLUTIONS.

Application filed January 5, 1920. Serial No. 349,574.

*To all whom it may concern:*

Be it known that we, (1) FREDERICK LAIST and (2) JAMES ORR ELTON, citizens of the United States, residing at (1) Anaconda, (2) Great Falls, in the counties of (1) Deerlodge, (2) Cascade, and State of Montana, have invented certain new and useful Improvements in Processes of Preparing Pure Zinc-Sulphate Solutions, of which the following is a specification.

This invention is a novel process for the preparation of purified zinc sulphate solutions, suitable for use for the electrolytic deposition of zinc, or for the preparation of zinc salts free from iron, copper, arsenic, antimony, etc.

In the preparation of such solutions from ores, it is customary to add to the dilute sulfuric acid leaching solution a sufficient proportion of iron, either as ferrous or ferric sulphate or as metallic iron, together with appropriate oxidizing agents, to insure the elimination of arsenic, antimony and such other elements as are precipitated with iron upon neutralization of the solution.

In the leaching operation, all, or nearly all of the acid present in the leaching solution is neutralized in order to insure a solution of sufficient purity as regards iron, arsenic, antimony, etc., to allow of successful electrolysis for the production of metallic zinc or to permit the production of zinc salts free from the above impurities. The copper content of the solution resulting from this leach is usually removed by agitation with zinc dust, blue powder, zinc shot, zinc balls, or zinc scrap. In plants using zinc dust, shot, or balls it is customary to dissolve the scrap and floor cleanings containing metallic zinc in dilute sulfuric acid, and to add the resulting zinc-bearing solution to the unpurified solution from the leaching operation. The addition of this scrap zinc and cleanings to the melting furnace for zinc cathode sheets is very detrimental to the successful operation of the melting furnace. No benefit is derived from the addition to the leaching solution of these scrap cleanings, other than the recovery of their zinc content; and no benefit is derived from the addition of metallic iron other than the provision of sufficient iron to remove arsenic, antimony, etc. The zinc used to precipitate the copper from the solution resulting from the leaching operation must of course in any accounting system bear the cost of recovering an equal amount of zinc from the solution so purified, plus the cost of any zinc so added but not recovered in the precipitation of copper or in the later treatment of the purification residue. The solution so purified with zinc is usually neutral or nearly so, although it is recognized that a slightly acid solution will give a higher efficiency from the zinc used in the precipitation of copper. It is also known that at least a portion of the chlorin in solution may be removed by agitating slightly acid solutions with metallic copper. Chlorin in the solution, especially as a chlorid, is very detrimental to the successful operation of a plant depositing zinc electrolytically from a sulphate solution, owing to its corrosive action on the lead anodes used.

According to the present invention the iron which is added to the leaching solution for the removal of arsenic, antimony, etc., and preferably also the zinc scrap and cleanings dissolved in dilute sulfuric acid for the recovery of their zinc contents, are made to perform the additional useful service of removing a portion or all of the copper dissolved from the ore in the leaching process, thereby decreasing or eliminating entirely the amount of zinc dust, shot, or balls required to be used for the removal of copper from the neutral or nearly neutral solution resulting from the leach. We thereby effect a material saving in the cost of producing pure zinc sulphate.

According to our process the ore is leached with dilute sulfuric acid of the desired strength, and the iron, arsenic, antimony, etc., after oxidation, are precipitated in any usual manner, as by neutralizing the solution with zinc oxid or calcine, before separating it from the undissolved residue. Sufficient zinc oxid, either as a pure product or as roasted zinc ore, is added after the neutralization of the acid in the leach to precipitate a portion or all of the copper contained in the solution resulting from the leaching process. This zinc oxid is preferably added to the leach, although it may be added to the solution from the leach after separating the solution and residue. Heating this solution aids in the precipitation of copper. The resulting pulp is sent to suitable apparatus such as a settling tank or a thickener of the Dorr type for the partial or complete separation of the solids and solution. The solids or thickened pulp containing freshly precipitated copper salts are sent to a second leaching tank or vat and dilute sulfuric acid is added to dissolve any soluble zinc and copper therein, a sufficient amount of acid being added to insure some excess of acid in the resulting solution after dissolving all of the readily soluble zinc and copper. The resulting pulp is sent to suitable apparatus as a settler or thickener for separating the solids and solution, the solution being returned to a tank or vat to which is added metallic iron preferably in quantity sufficient to supply the needs of the plant for the removal of arsenic, antimony, etc., and preferably also the scrap zinc and cleanings recovered from the production of electrolytic zinc and zinc sulphate solution. The copper carried by this acid solution will be rapidly precipitated by the metallic iron and zinc giving a residue high in metallic copper, and the iron and zinc contents of the solution will be increased while at the same time effecting a reduction of the chlorin content of the solution. This solution is then sent to the original leaching vats or tanks where suitable oxidizing agents are added to convert the ferrous sulphate to ferric sulphate before neutralization, thereby completing the cycle.

One effect of the operation as above described is greatly to reduce the amount of residue or sludge from the neutral solution purification system that must be re-treated for recovery of its zinc, copper and cadmium content.

The accompanying drawing is a flow sheet illustrating the process in its preferred embodiment.

We claim:—

1. Process of preparing zinc sulphate solutions free from arsenic, antimony and copper from ores, comprising leaching the ores with dilute sulfuric acid; precipitating ferric iron from the solution and thereby eliminating arsenic and antimony; precipitating copper from the resulting solution by means of zinc oxid; separating said solution from the copper-bearing residue and further purifying the same as required; treating said residue with sulfuric acid to dissolve the copper and produce an acid copper-bearing solution; and precipitating copper from said solution.

2. Process of preparing zinc sulphate solutions free from arsenic, antimony and copper from ores, comprising leaching the ores with dilute sulfuric acid; precipitating ferric iron from the solution and thereby eliminating arsenic and antimony; precipitating copper from the resulting solution by means of zinc oxid; separating said solution from the copper-bearing residue and further purifying the same as required; treating said residue with sulfuric acid to dissolve the copper and produce an acid copper-bearing solution; precipitating copper from said solution by means of iron; and returning the resulting iron-bearing solution to the ore-leaching operation.

3. Process of preparing zinc sulphate solutions free from arsenic, antimony and copper from ores, comprising leaching the ores with dilute sulfuric acid; precipitating ferric iron from the solution and thereby eliminating arsenic and antimony; precipitating copper from the resulting solution by means of zinc oxid; separating said solution from the copper-bearing residue and further purifying the same as required; treating said residue with sulfuric acid to dissolve the copper and produce an acid copper-bearing solution; adding iron and zinc to said solution to precipitate copper; and returning the resulting iron and zinc bearing solution to the ore-leaching operation.

4. In a process of treating impure zinc sulphate solutions, the steps comprising adding iron and zinc thereto to precipitate copper, and returning the resulting iron and zinc bearing solutions to the ore-leaching operation.

In testimony whereof, we affix our signatures.

FREDERICK LAIST.
JAMES ORR ELTON.